(12) United States Patent
Zang et al.

(10) Patent No.: US 7,144,942 B2
(45) Date of Patent: *Dec. 5, 2006

(54) COMPOSITION AND PROCESS FOR THE SEALING OF MICROCUPS IN ROLL-TO-ROLL DISPLAY MANUFACTURING

(75) Inventors: HongMei Zang, Sunnyvale, CA (US); Xiaojia Wang, Fremont, CA (US); Rong-Chang Liang, Sunnyvale, CA (US)

(73) Assignee: SiPix Imaging, Inc., Fremont, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/222,454

(22) Filed: Aug. 16, 2002

(65) Prior Publication Data

US 2003/0004254 A1    Jan. 2, 2003

Related U.S. Application Data

(62) Division of application No. 09/874,391, filed on Jun. 4, 2001, now abandoned.

(51) Int. Cl.
*C08K 5/01*    (2006.01)

(52) U.S. Cl. ............ 524/474; 156/277; 156/292; 359/254; 359/265; 359/296; 359/316

(58) Field of Classification Search ................ 524/474; 156/277, 292; 359/254, 265, 296, 316
See application file for complete search history.

(56) References Cited

U.S. PATENT DOCUMENTS

| | | | |
|---|---|---|---|
| 3,612,758 A | 10/1971 | Evans et al. ............. 178/5.4 R |
| 3,668,106 A | 6/1972 | Ota | |
| 4,071,430 A | 1/1978 | Liebert | |
| 4,093,534 A | 6/1978 | Carter et al. | |
| 4,285,801 A | 8/1981 | Chiang | |
| 4,411,115 A | 10/1983 | Marzouki et al. .......... 52/309.1 |
| 4,680,103 A | 7/1987 | Beilin et al. | |
| 4,721,739 A | 1/1988 | Brenneman et al. | |
| 4,741,988 A | 5/1988 | Van der Zande et al. ... 430/312 |
| 4,881,996 A | 11/1989 | Nusabaum et al. | |
| 5,234,987 A | 8/1993 | Hubbard et al. ............ 524/505 |
| 5,276,438 A | 1/1994 | DiSanto et al. ............. 345/107 |
| 5,279,511 A | 1/1994 | DiSanto et al. ............... 445/24 |
| 5,380,362 A | 1/1995 | Schubert | |
| 5,403,518 A | 4/1995 | Schubert | |
| 5,492,963 A | 2/1996 | Ozawa et al. | |
| 5,534,583 A | 7/1996 | Roberts et al. | |
| 5,573,711 A | 11/1996 | Hou et al. | |
| 5,589,100 A | 12/1996 | Grasso et al. .......... 252/299.01 |
| 5,699,097 A | 12/1997 | Takayama et al. .......... 347/171 |
| 5,914,806 A | 6/1999 | Gordon II et al. | |
| 5,930,026 A | 7/1999 | Jacobson et al. | |
| 5,932,648 A | 8/1999 | Troska et al. ................ 524/505 |
| 5,961,804 A | 10/1999 | Jacobson et al. | |
| 5,993,900 A | 11/1999 | Hansen et al. ........... 427/208.2 |
| 6,017,584 A | 1/2000 | Albert et al. | |
| 6,067,185 A | 5/2000 | Albert et al. ................ 359/296 |
| 6,113,810 A | 9/2000 | Hou et al. ................... 252/572 |
| 6,120,588 A | 9/2000 | Jacobson ................. 106/31.16 |
| 6,120,839 A | 9/2000 | Comiskey ................ 427/213.3 |
| 6,172,798 B1 | 1/2001 | Albert et al. ................ 359/296 |
| 6,184,856 B1 | 2/2001 | Gordon, II et al. ......... 345/107 |
| 6,294,257 B1 | 9/2001 | Tsukakoshi et al. | |
| 6,312,304 B1 | 11/2001 | Duthaler et al. .............. 445/24 |
| 6,327,072 B1 | 12/2001 | Comiskey et al. .......... 359/296 |
| 6,337,358 B1 | 1/2002 | Whitehouse et al. | |
| 6,337,761 B1 | 1/2002 | Rogers et al. ............. 359/296 |
| 6,361,830 B1 | 3/2002 | Schenk et al. | |
| 6,392,786 B1 | 5/2002 | Albert ........................ 359/296 |
| 6,400,492 B1 * | 6/2002 | Morita et al. ................ 359/296 |
| 6,750,844 B1 * | 6/2004 | Nakanishi .................... 345/107 |
| 6,751,007 B1 * | 6/2004 | Liang et al. ................. 359/296 |
| 6,788,449 B1 * | 9/2004 | Liang et al. ................. 359/296 |
| 6,795,229 B1 * | 9/2004 | Liang et al. ................. 359/296 |
| 6,850,355 B1 * | 2/2005 | Liang et al. ................. 359/296 |
| 2002/0182544 A1 | 12/2002 | Chan-Park et al. ......... 430/311 |

FOREIGN PATENT DOCUMENTS

| | | |
|---|---|---|
| EP | 0 468 593 | 1/1992 |
| EP | 1 089 118 A2 | 4/2001 |
| JP | 59-171930 | 9/1984 |
| WO | WO 99/56171 | 11/1999 |
| WO | WO 00/60410 | 10/2000 |
| WO | WO 01/67170 A1 | 9/2001 |

OTHER PUBLICATIONS

Chan-Park, M., et al., "Process for Roll-to-Roll Manufacture of a Display by Synchronized Photolithographic Exposure on a Substrate Web", U.S. Appl. No. 09/784,972—filed Feb. 15, 2001.

Dalisa, A. L., "Electrophoretic Display Technology", *IEEE Trans. Electron Devices*—24:827-834 (1977).

(Continued)

*Primary Examiner*—Edward J. Cain
(74) *Attorney, Agent, or Firm*—Howrey LLP

(57) ABSTRACT

The invention relates to a novel sealing composition for the manufacture of an electrophoretic or liquid crystal display, and a sealing process using the composition. The composition allows electrophoretic or liquid crystal cells to be seamlessly sealed and the sealing layer free of any defects.

15 Claims, 6 Drawing Sheets

OTHER PUBLICATIONS

Harvey, T.G., "Replication Techniques for Micro-Optics," *SPIE Proc.*—3099:76-82 (1997).

Hopper, M.A., et al., "An Electrophoretic Display, its Properties, Model, and Addressing", *IEEE Trans. Electr. Dev.*—26(8):1148-1152 (1979).

Legge, N.R., et al., "Thermoplastic Elastomers", *Hanser Publishers*—(1987).

Murau, P., et al., "The Understanding and Elimination of Some Suspension Instabilities in an Electrophoretic Display", *J. App. Phys.*—49(9):4820-4829 (1978).

Slafer, W.D., "Continuous Manufacturing of Thin Cover Sheet Optical Media", *SPIE Proc.*—1663:324-334 (1992).

Cominsky, B. et al., "An Electrophoretic Ink For All-Printed Reflective Electronic Displays", Letters to Nature, pp. 253-255 (1998).

Lewis, J.C., et al., "Gravitational, Inter-Particle-Electrode Forces in Electrophoretic Display", Proceedings of the S.I.D., vol. 18/3&4 (1977).

Nakamura, E., et al., "Development of Electrophoretic Display Using Microcapsulated Suspension", SID Digest, (1998), pp. 1014-1017.

Singer, B. and Dalisa, A.L., "An X-Y Addressable Electrophoretic Display", Proceeding of the S.I.D., VOL. 18/3&4, (1977).

U.S. Appl. No. 09/518,488, filed Mar. 3, 2000 (Available Upon Request).

* cited by examiner

COMPOSITION AND PROCESS FOR THE SEALING OF MICROCUPS IN ROLL-TO-ROLL DISPLAY MANUFACTURING

CROSS-REFERENCE TO RELATED APPLICATIONS

This application is a divisional of U.S. application Ser. No. 09/874,391, filed Jun. 4, 2001 now abandoned.

BACKGROUND

The electrophoretic display (EPD) is a non-emissive device based on the electrophoresis phenomenon influencing charged pigment particles suspended in a solvent. This general type of display was first proposed in 1969. An EPD typically comprises a pair of opposed, spaced-apart plate-like electrodes, with spacers predetermining a certain distance between the electrodes. One of the electrodes is typically transparent. A suspension composed of a colored solvent and suspended charged pigment particles is enclosed between the two plates.

When a voltage difference is imposed between the two electrodes, the pigment particles migrate by attraction to the plate of polarity opposite that of the pigment particles. Thus the color showing at the transparent plate may be determined by selectively charging the plates to be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the voltage or charging time.

Among the advantages of an electrophoretic display (EPD) over other types of flat panel displays is the very low power consumption. This salient advantage makes EPDs particularly suitable for portable and battery powered devices such as laptops, cell phones, personal digital assistants, portable electronic medical and diagnostic devices, global positioning system devices, and the like.

In order to prevent undesired movements of the particles such as sedimentation, partitions were proposed between the two electrodes for dividing the space into smaller cells. See, e.g., M. A Hopper and V. Novotny, IEEE Trans. Electr. Dev., Vol ED 26, No. 8, pp 1148–1152 (1979). However, in the case of the partition-type EPD, some difficulties are encountered in the formation of the partitions and the process of enclosing the suspension. Furthermore, it is also difficult to keep different colors of suspensions separate from each other in the partition-type EPD.

Attempts have been made to enclose the suspension in microcapsules. U.S. Pat. Nos. 5,961,804 and 5,930,026 describe microencapsulated EPDs. These displays have a substantially two dimensional arrangement of microcapsules each containing an electrophoretic composition comprising a dielectric fluid with charged pigment particles suspended therein and the particles visually contrast with the dielectric solvent. The microcapsules can be formed by interfacial polymerization, in-situ polymerization or other known methods such as in-liquid curing or simple/complex coacervation. The microcapsules, after their formation, may be injected into a cell housing two spaced-apart electrodes, or they may be "printed" into or coated on a transparent conductor film. The microcapsules may also be immobilized within a transparent matrix or binder that is itself sandwiched between the two electrodes.

The EPDs prepared by these prior art processes, in particular the microencapsulation process, as disclosed in U.S. Pat. No. 5,930,026, No. 5,961,804, and No. 6,017,584, have several shortcomings. For example, the EPDs manufactured by the microencapsulation process suffer from sensitivity to environmental changes (in particular sensitivity to moisture and temperature) due to the wall chemistry of the microcapsules. Secondly the EPDs based on the microcapsules have poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art EPD of this type has poor resolution and addressability for color applications.

Recently an improved EPD technology was disclosed in co-pending applications, U.S. Ser. No. 09/518,488, filed on Mar. 3, 2000 and U.S. Ser. No. 09/784,972, filed on Feb. 25, 2001. The cells of the improved EPD are formed from a plurality of microcups which are formed integrally with one another as portions of a structured two-dimensional array assembly. Each microcup of the array assembly is filled with a suspension or dispersion of charged pigment particles in a dielectric solvent, and sealed to form an electrophoretic cell.

The substrate web upon which the microcups are formed includes a display addressing array comprising pre-formed conductor film, such as ITO conductor lines. The conductor film (ITO lines) is coated with a radiation curable polymer precursor layer. The film and precursor layer are then exposed imagewise to radiation to form the microcup wall structure. Following exposure, the precursor material is removed from the unexposed areas, leaving the cured microcup walls bonded to the conductor film/support web. The imagewise exposure may be accomplished by UV or other forms of radiation through a photomask to produce an image or predetermined pattern of exposure of the radiation curable material coated on the conductor film. Although it is generally not required, the mask may be positioned and aligned with respect to the conductor film, i.e., ITO lines, so that the transparent mask portions align with the spaces between ITO lines, and the opaque mask portions align with the ITO material (intended for microcup cell floor areas).

Alternatively, the microcup array may be prepared by a process including embossing a thermoplastic or thermoset precursor layer coated on a conductor film with a pre-patterned male mold, followed by releasing the mold. The precursor layer may be hardened by radiation, cooling, solvent evaporation, or other means during or after the embossing step. This novel micro-embossing method is disclosed in the co-pending application, U.S. Ser. No. 09/518,488, filed Mar. 3, 2000.

Solvent-resistant, thermomechanically stable microcups having a wide range of size, shape, pattern and opening ratio can be prepared by either one of the aforesaid methods.

The manufacture of a monochrome EPD from a microcup assembly involves filling the microcups with a single pigment suspension composition, sealing the microcups, and finally laminating the sealed array of microcups with a second conductor film pre-coated with an adhesive layer.

For a color EPD, its preparation from a microcup assembly involves sequential selective opening and filling of predetermined microcup subsets. The process includes laminating or coating the pre-formed microcups with a layer of positively working photoresist, selectively opening a certain number of the microcups by imagewise exposing the positive photoresist, followed by developing the resist, filling the opened cups with a colored electrophoretic fluid, and sealing the filled microcups by a sealing process. These steps may be repeated to create sealed microcups filled with electrophoretic fluids of different colors. Thus, the array may be filled with different colored compositions in predetermined areas to form a color EPD. Various known pigments and dyes provide a wide range of color options for both solvent phase and suspended particles. Known fluid application and filling mechanisms may be employed.

The sealing of the microcups after they are filled with a dispersion of charged pigment particles in a dielectric fluid can be accomplished by overcoating the electrophoretic fluid with a solution containing a thermoplastic or thermoset precursor. To reduce or eliminate the degree of intermixing during and after the overcoating process, it is highly advantageous to use a sealing composition that is immiscible with the electrophoretic fluid and preferably has a specific gravity lower than the dielectric fluid. The sealing is then accomplished by hardening the precursor by solvent evaporation, interfacial reaction, moisture, heat, radiation, or a combination of curing mechanisms. Alternatively, the sealing can be accomplished by dispersing a thermoplastic or thermoset precursor in the electrophoretic fluid before the filling step. The thermoplastic or thermoset precursor is immiscible with the dielectric solvent and has a specific gravity lower than that of the solvent and the pigment particles. After filling, the thermoplastic or thermoset precursor phase separates from the electrophoretic fluid and forms a supernatant layer at the top of the fluid. The sealing of the microcups is then conveniently accomplished by hardening the precursor layer by solvent evaporation, interfacial reaction, moisture, heat, or radiation. UV radiation is the preferred method to seal the microcups, although a combination of two or more curing mechanisms as described above may be used to increase the throughput of sealing.

The improved EPDs may also be manufactured by a synchronized roll-to-roll photolithographic exposure process as described in the co-pending application, U.S. Ser. No. 09/784,972, filed on Feb. 25, 2001. A photomask may be synchronized in motion with the support web using mechanisms such as coupling or feedback circuitry or common drives to maintain the coordinated motion (i.e., to move at the same speed). Following exposure, the web moves into a development area where the unexposed material is removed to form the microcup wall structure. The microcups and ITO lines are preferably of selected size and coordinately aligned with the photomask, so that each completed display cell (i.e., filled and sealed microcup) may be discretely addressed and controlled by the display driver. The ITO lines may be pre-formed by either a wet or a dry etching process on the substrate web.

For making color displays from the microcup array, the synchronized roll-to-roll exposure photolithographic process also enables continuous web processes of selective opening, filling and sealing of pre-selected subsets of the microcup array.

The microcup array may be temporarily sealed by laminating or coating with a positive-acting photoresist composition, imagewise exposing through a corresponding photomask, and developing the exposed area with a developer to selectively open a desired subset of the microcups. Known laminating and coating mechanisms may be employed. The term "developer" in this context refers to a suitable known means for selectively removing the exposed photoresist, while leaving the unexposed photoresist in place.

Thus, the array may be sequentially filled with several different color compositions (typically three primary colors) in a pre-determined cell pattern. For example, the imagewise exposure process may employ a positively working photoresist top laminate or coating which initially seals the empty microcups. The microcups are then exposed through a mask (e.g., a loop photomask in the described roll-to-roll process) so that only a first selected subset of microcups are exposed. Development with a developer removes the exposed photoresist and thus opens the first microcup subset to permit filling with a selected color pigment dispersion composition, and sealing by one of the methods described herein. The exposure and development process is repeated to expose and open a second selected microcup subset, for filling with a second pigment dispersion composition, with subsequent sealing. Finally, the remaining photoresist is removed and the third subset of microcups is filled and sealed.

Liquid crystal displays (LCDs) may also be prepared by the method as described above when the electrophoretic fluid is replaced by a suitable liquid crystal composition having the ordinary refractive index matched to that of the isotropic cup material. In the "on" state, the liquid crystal in the microcups is aligned to the field direction and is transparent. In the "off" state, the liquid crystal is not aligned and scatters light. To maximize the light scattering effect of the LCDs, the diameter of the microcups is typically in the range of 0.5–10 microns.

The roll-to-roll process may be employed to carry out a sequence of processes on a single continuous web, by carrying and guiding the web to a plurality of process stations in sequence. In other words, the microcups may be formed, filled or coated, developed, sealed, and laminated in a continuous sequence.

In addition to the manufacture of microcup displays, the synchronized roll-to-roll process may be adapted to the preparation of a wide range of structures or discrete patterns for electronic devices formable upon a support web substrate, e.g., patterned conductor films, flexible circuit boards and the like. As in the process and apparatus for EPD microcups described herein, a pre-patterned photomask is prepared which includes a plurality of photomask portions corresponding to structural elements of the subject device. Each such photomask portion may have a pre-selected area of transparency or opacity to radiation so as to form an image of such a structural element upon the correspondingly aligned portion of the web during exposure. The method may be used for selective curing of structural material, or may be used to expose positively or negatively acting photoresist material during manufacturing processes.

Because these multiple-step processes may be carried out roll-to-roll continuously or semi-continuously, they are suitable for high volume and low cost production. These processes are also efficient and inexpensive as compared to other processes for manufacturing display products. The improved EPD involving microcups is not sensitive to environment, such as humidity and temperature. The display is thin, flexible, durable, easy-to-handle, and format-flexible. Since the EPD comprises cells of favorable aspect ratio and well-defined shape and size, the bi-stable reflective display has excellent color addressability, high contrast ratio and color saturation, fast switching rate and response time.

SUMMARY OF THE INVENTION

Sealing of the microcups by a continuous web process is one of the most critical steps in the roll-to-roll manufacturing of the improved EPDs. In order to prepare a high quality display, the sealing layer must have at least the following characteristics: (1) free of defects such as entrapped air bubble, pin holes, cracking or leaking, etc; (2) good film integrity and barrier properties against the display fluid such as dielectric fluids for EPDs; and (3) good coating and adhesion properties. Since most of the dielectric solvents used in EPDs are of low surface tension and low viscosity, it has been a major challenge to achieve a seamless, defect-free sealing with good adhesion properties for the microcups.

It has now been found that microcups filled with a display fluid such as an electrophoretic fluid can be sealed seamlessly and free of defects by a continuous web process using a novel sealing overcoat composition comprising the following ingredients:
(1) a solvent or solvent mixture which is immiscible with the display fluid in the microcups and exhibits a specific gravity less than that of the display fluid; and
(2) a thermoplastic elastomer.

Compositions containing at least a thermoplastic elastomer having good compatibility with the microcups and good barrier properties against the display fluid are particularly useful. Examples of useful thermoplastic elastomers include di-block, tri-block or multi-block copolymers represented by the formulas ABA or (AB)n in which A is styrene, α-methylstyrene, ethylene, propylene or norbornene; B is butadiene, isoprene, ethylene, proplyene, butylene, dimethylsiloxane or propylene sulfide; and A and B cannot be the same in the formula.

The thermoplastic elastomer is dissolved in a solvent or solvent mixture which is immiscible with the display fluid in the microcups and exhibits a specific gravity less than that of the display fluid. Low surface tension solvents are preferred for the overcoating composition because of their better wetting properties over the microcup surface and the electrophoretic fluid. Solvents or solvent mixtures having a surface tension lower than 35 dyne/cm are preferred. A surface tension lower than 30 dyne/cm is more preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane, decalin and the like), alkylbenzenes (preferably mono- or di-$C_{1-6}$alkyl benzenes such as toluene, xylene and the like), alkyl esters (preferably $C_{2-5}$alkyl esters such as ethyl acetate, isobutyl acetate and the like) and $C_{3-5}$ alkyl alcohols (such as isopropanol and the like and their isomers.

In addition to the fact that the electrophoretic cells prepared from microcups may be sealed seamlessly and free of defects by a continuous web process using this novel sealing composition, the composition also has many other advantages. For example, it also exhibits good wetting properties over the filled microcups throughout the coating process and develops a good film integrity over the display fluid even before the solvent evaporates completely. As a result, the integrity of the coating is maintained and no dewetting or beading on the electrophoretic fluid is observed. In addition, the composition of the present invention enables the continuous sealing of wider microcups, particularly those having a width greater than 100 microns. Wider microcups are preferred in some applications because of their higher microcup opening-to-wall ratio and better display contrast ratio. Furthermore, the sealing composition of the present invention enables the formation of a sealing layer less than 3 microns thick which is typically difficult to achieve by using traditional sealing compositions. The thinner sealing layer shortens the distance between the top and bottom electrodes and results in a faster switching rate.

Co-solvents and wetting agents may also be included in the composition to improve the adhesion of the sealant to the microcups and provides a wider coating process latitude. Other ingredients such as crosslinking agents, vulcanizers, multifunctional monomers or oligomers, and high Tg polymers that are miscible with one of the blocks of the thermoplastic elastomer are also highly useful to enhance the physicomechanical properties of the sealing layer during or after the overcoating process. The sealed microcups may be post treated by UV radiation or thermal baking to further improve the barrier properties. The adhesion of the sealing layer to the microcups may also be improved by the post-curing reaction, probably due to the formation of an interpenetration network at the microcup-sealing layer interphase.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations, which may be created by methods such as micro-embossing or imagewise exposure as described in the co-pending patent applications identified above. Likewise, the plural form "microcups" in a collective context may in general refer to the microcup assembly comprising a plurality of such microcups integrally formed or joined to make a structured two-dimensional microcup array.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size, pattern and aspect ratio which are pre-determined according to the specific parameters of the manufacturing process.

The term "aspect ratio" is a commonly known term in the art and is the depth to width ratio or the depth to diameter ratio of the microcup opening.

The term "imagewise exposure" means exposure of radiation-curable material or photoresist composition to radiation, such as UV, using one of the methods of the invention, whereby the portions of the material so exposed are controlled to form a pattern or "image" corresponding to the structure of the microcups, e.g., the exposure is restricted to the portions of the material corresponding to the microcup walls, leaving the microcup floor portion unexposed. In the case of selectively opening photoresist on predetermined portions of the microcup array, imagewise exposure means exposure on the portions of material corresponding to the cup opening, leaving the microcup walls unexposed. The pattern or image may be formed by such methods as exposure through a photomask, or alternatively by controlled particle beam exposure, and the like.

II. The Microcup Array

Figure 1:
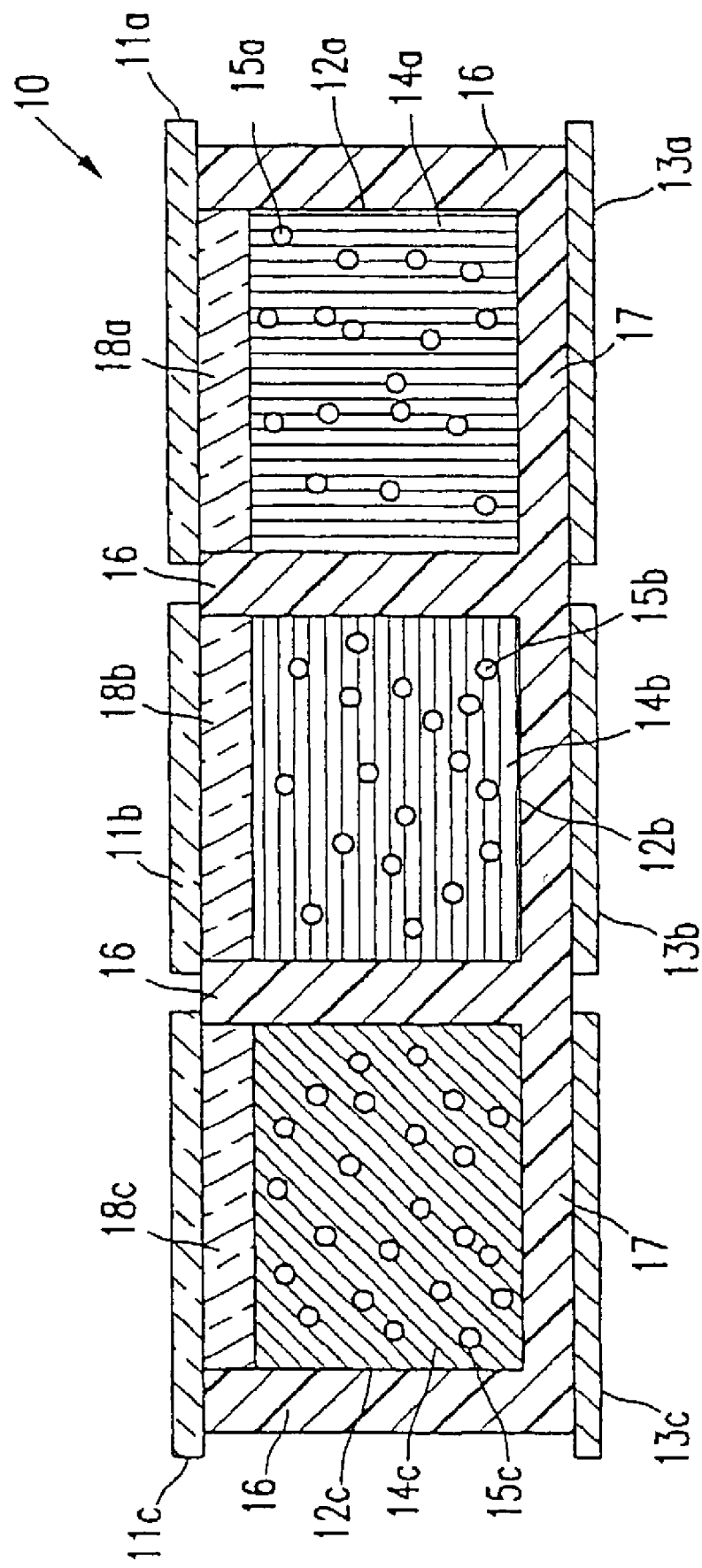
FIG. 1 is a schematic cross-section of an EPD, showing three microcup cells in a neutral condition.
Figure 2:
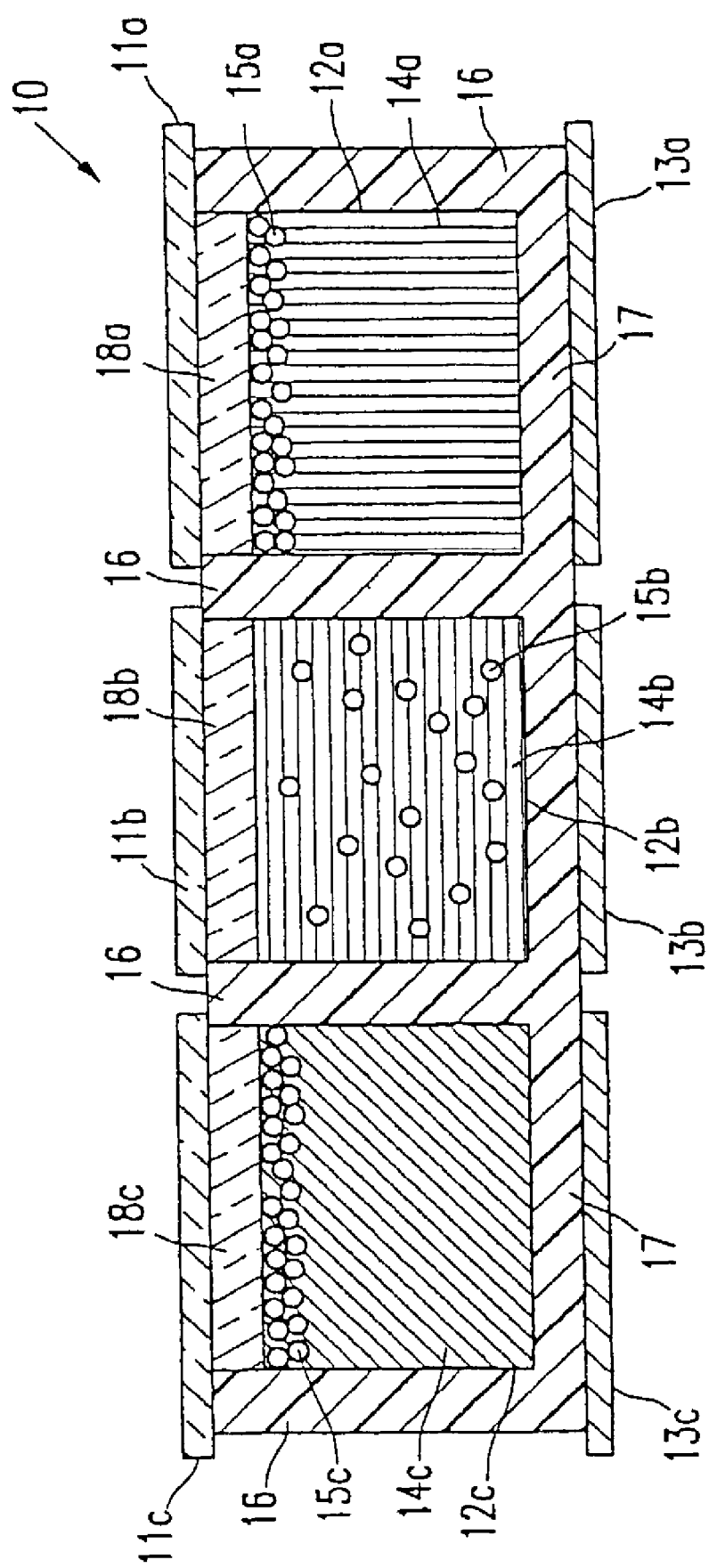
FIG. 2 is a schematic cross-section of the EPD of FIG. 1, but with two of the cells charged, to cause the pigment to migrate to one plate.

FIGS. 1 and 2 are schematic cross-section views of an exemplary microcup array assembly embodiment, simplified for clarity, showing a microcup array assembly (10) of three microcup cells (12a, b, and c).

As shown in FIG. 1, each cell (12) of array (10) comprises two electrode plates (11, 13), at least one of which is transparent (11), such as an ITO electrode, the electrodes (11) and (13) bounding two opposite faces of the cell (12).

The microcup cell array assembly (10) comprises a plurality of cells which are disposed adjacent to one another within a plane to form a layer of cells (12) enclosed between the two electrodes layers (11) and (13). Three exemplary cells (12a), (12b), and (12c) are shown, bounded by their respective electrode plates (11a), (11b), and (11c) (transparent) and (13a), (13b), and (13c) (back plates), it being understood that a large number of such cells are preferably arrayed two-dimensionally (to the right/left and in/out of the plane in FIG. 1) to form a sheet-like display of any selected area and two-dimensional shape. Likewise, several microcup cells may be bounded by a single electrode plate (11) or (13), although, for clarity, FIG. 1 shows an example in which each cell (12) is bounded by separate electrode plates (11) and (13) having the width of a single cell.

The cells are of well-defined shape and size and are filled with a colored dielectric solvent (14) in which charged pigment particles (15) are suspended and dispersed. The cells (12) may be each filled with the same composition of pigment and solvent (e.g., in a monochrome display) or may be filled with different compositions of pigment and solvent (e.g., in a color display). FIG. 1 shows three different color combinations as indicated by the different hatch pattern in each cell (12a), (12b), and (12c), the solvents being designated (14a), (14b), and (14c) respectively, and the pigment particles being designated (15a), (15b), and (15c) respectively.

The microcup cells (12) each comprise enclosing walls (16) bounding the cells on the sides (within the plane of array (10)) and floor (17) bounding the cell on one face, in this example the face adjacent to electrode (13). On the opposite face (adjacent electrode (11)) each cell comprises sealing cap portion (18). Where the sealing cap portion is adjacent to the transparent electrode (11) (as in FIG. 1), the sealing cap (18) comprises a transparent composition. Although in the example of FIG. 1, the floor (17) and the sealing cap (18) are shown as separate cell portions distinct from adjacent electrodes (13) and (11) respectively, alternative embodiments of the microcup array (10) of the invention may comprise an integral floor/electrode structure or an integral sealing cap/electrode structure.

FIG. 2 is a schematic cross-section of the EPD of FIG. 1, but with two of the cells charged (12a and 12c), to cause the pigment to migrate to one plate. When a voltage difference is imposed between the two electrodes (11, 13), the charged particles (15) migrate (i.e., toward electrode (11) or (13) depending on the charge of the particle and electrode), such that either the color of the pigment particle (15) or the color of the solvent (14) is seen through the transparent conductor film (11). At least one of the two conductors (11) or (13) is patterned (separately addressable portions ) to permit a selective electric field to be established with respect to either each cell or with respect to a pre-defined group of cells (e.g., to form a pixel).

In the example of FIG. 2, two of the cells are shown charged (12a and 12c), in which the pigment (15a and 15c) has migrated to the respective transparent electrode plates (11a and 11c). The remaining cell (12b) remains neutral and pigment (15b) is dispersed throughout solvent (14b).

Figure 3B:
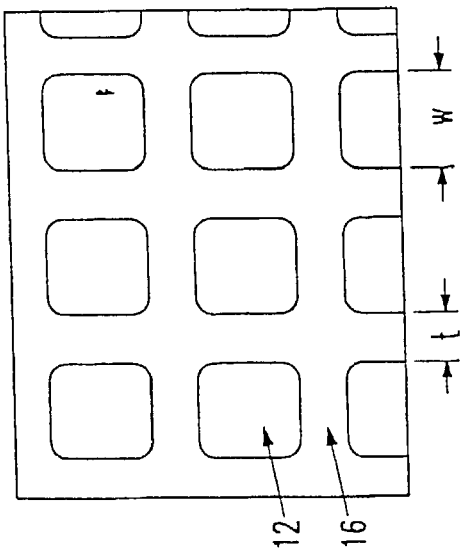
FIGS. 3A–3C shows the contours of an exemplary microcup array, FIG. 3A showing a perspective view, FIG. 3B showing a plan view, and FIG. 3C showing an elevation view, the vertical scale being exaggerated for clarity.
Figure 3A:
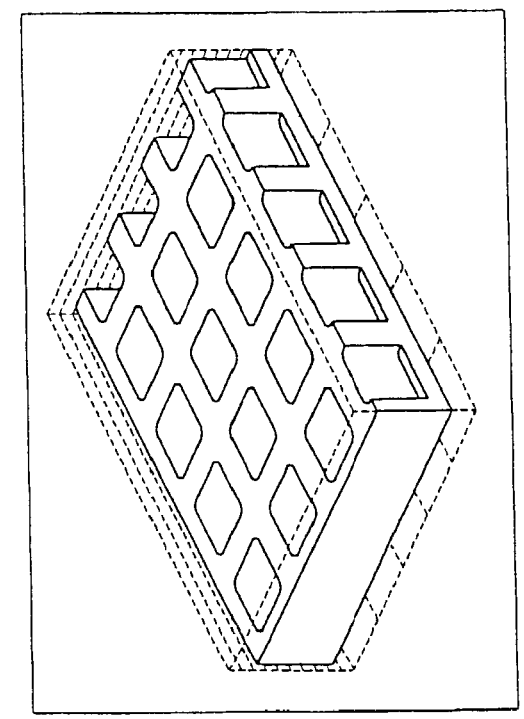
Figure 3C:
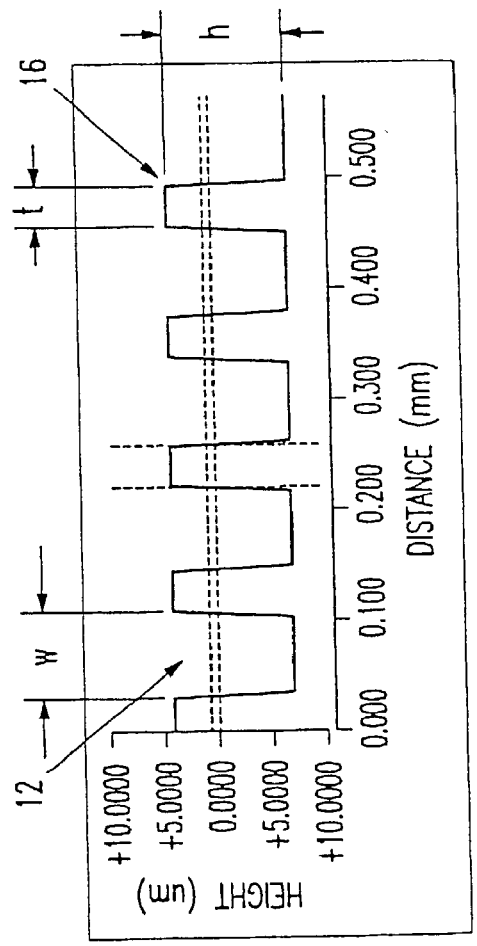

FIGS. 3A–3C shows the contours of an exemplary portion of a microcup array, FIG. 3A showing a perspective view, FIG. 3B showing a plan view, and FIG. 3C showing an elevation view, the vertical scale being exaggerated for clarity. For reflective EPDs, the opening area of each individual microcup may preferably be in the range of about $10^2$ to about $5 \times 10^5$ µm², more preferably from about $10^3$ to about $5 \times 10^4$ µm². The width w of the microcup (12) (distance between adjacent walls (16)) may vary over a wide range, and is selectable to suit the desired final display characteristics. The width w of the microcup openings preferably is in the range of from about 15 to about 450 µm, and more preferably from about 25 to about 300 µm from edge to edge of the openings. Each microcup may form a small segment of a pixel of the final display, or may be a full pixel.

The wall thickness t relative to the cup width w may vary over a large range, and is selectable to suit the desired final display characteristics. The microcup wall thickness is typically from about 0.01 to about 1 times the microcup width, and more preferably about 0.05 to about 0.25 times the microcup width. The opening-to-total area ratio is preferably in the range of about 0.1 to about 0.98, more preferably from about 0.3 to about 0.95.

The microcup wall height h (which defines the cup depth) is shown exaggerated beyond its typical proportional dimensions for clarity. For EPDs, the height of the microcups is typically in the range of about 5 to about 100 microns (µms), preferably from about 10 to about 50 microns. For LCDs, the height is typically in the range of about 1 to 10 microns and more preferably from about 2 to 5 microns.

For simplicity and clarity, a square microcup arranged in a linear two-dimensional array assembly is assumed in the description herein of the microcup array assembly of the invention. However, the microcup need not be square, it may be rectangular, circular, or a more complex shape if desired.

For example, the microcups may be hexagonal and arranged in a hexagonal close-packed array, or alternatively, triangular cups may be oriented to form hexagonal sub-arrays, which in turn are arranged in a hexagonal close-packed array.

In general, the microcups can be of any shape, and their sizes, pattern and shapes may vary throughout the display. This may be advantageous in the color EPD. In order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups;, and a number of small blue microcups. It is not necessary to have the same shape and number for the three colors.

The openings of the microcups may be round, square, rectangular, hexagonal, or any other shapes. The partition area between the openings is preferably kept small in order to achieve a high color saturation and contrast while maintaining desirable mechanical properties. Consequently the honeycomb-shaped opening is preferred over, for example, the circular opening.

III. Preparation of the Microcup Array

The microcups may be prepared by microembossing or by photolithography.

IIIa. Preparation of Microcups Array by Microembossing

Preparation of the Male Mold

The male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", SPIE Proc. Vol. 1663, pp. 324 (1992). The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76–82 (1997). Alternatively, the mold can be made by photomachining using plastics, ceramics or metals.

The male mold thus prepared typically has protrusions between about 1 to 500 microns, preferably between about 2 to 100 microns, and most preferred about 4 to 50 microns. The male mold may be in the form of a belt, a roller, or a sheet. For continuous manufacturing, the belt type of mold is preferred.

Microcup Formation

Micro-cups may be formed either in a batchwise process or in a continuous roll-to-roll process as disclosed in the co-pending application, U.S. Ser. No. 09/784,972, filed on Feb. 25, 2001. The latter offers a continuous, low cost, high throughput manufacturing technology for production of compartments for use in electrophoretic or LCDs. Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring and the like, over the male mold. The dispenser may be moving or stationary. A conductor film is overlaid the UV curable resin. Examples of suitable conductor film include transparent conductor ITO on plastic substrates such as polyethylene terephthalate, polyethylene, naphthalate, polyaramid, polyimide, polycycloolefin, polysulfone, epoxy and their composites. Pressure may be applied, if necessary, to ensure proper bonding between the resin and the plastic and to control the thickness of the floor of the micro-cups. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin which should have a good release property against the mold surface.

IIIb. Preparation of Microcup Array by Photolithography

The photolithographic processes for preparation of the microcup array are described in FIGS. 4 and 5.

Top Exposure

Figure 4A:
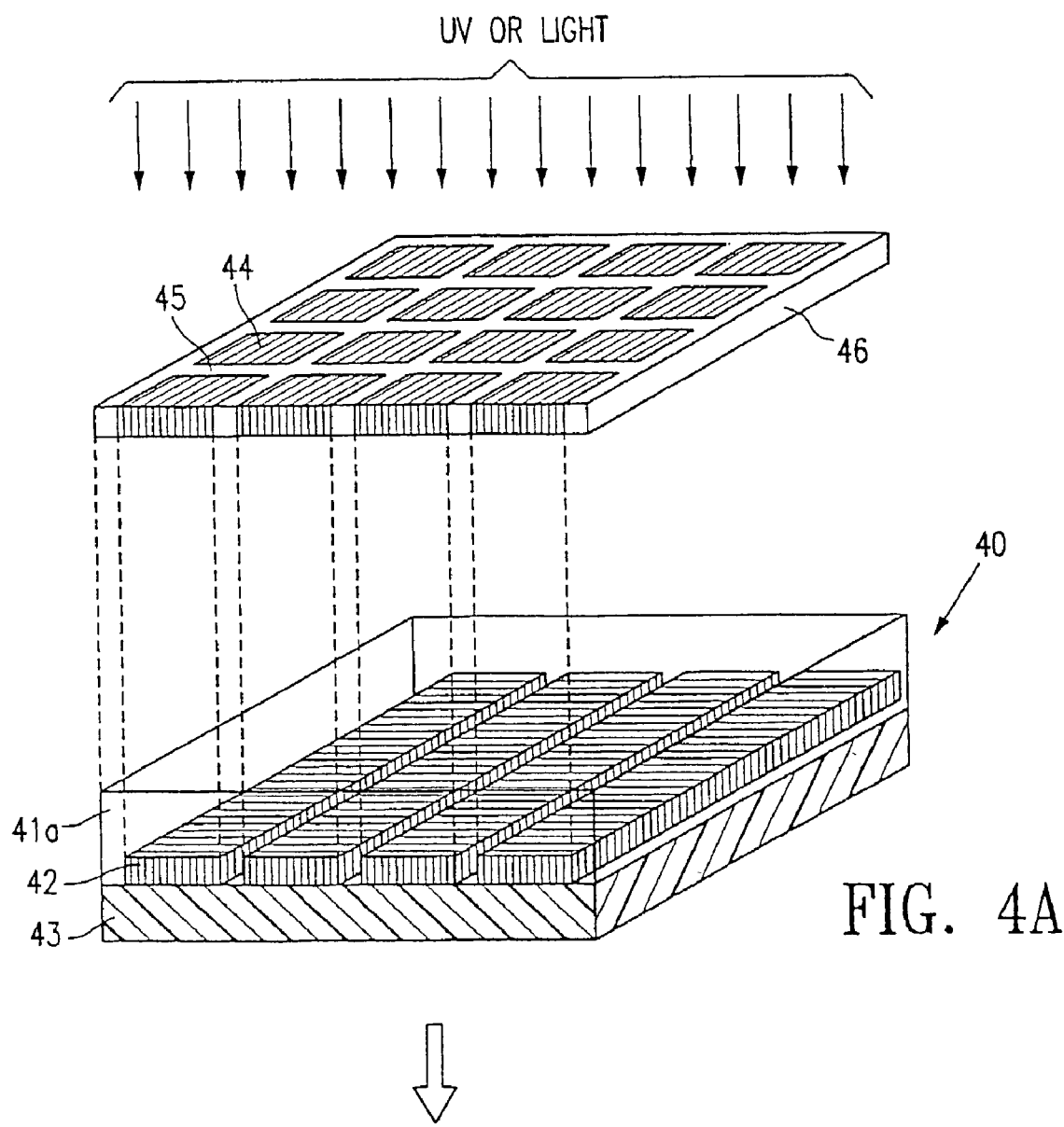
FIGS. 4A and 4B show the basic processing steps for preparing the microcups involving imagewise photolithographic exposure through a photomask ("top exposure") of the conductor film coated with a thermoset precursor, to UV radiation.
Figure 4B:
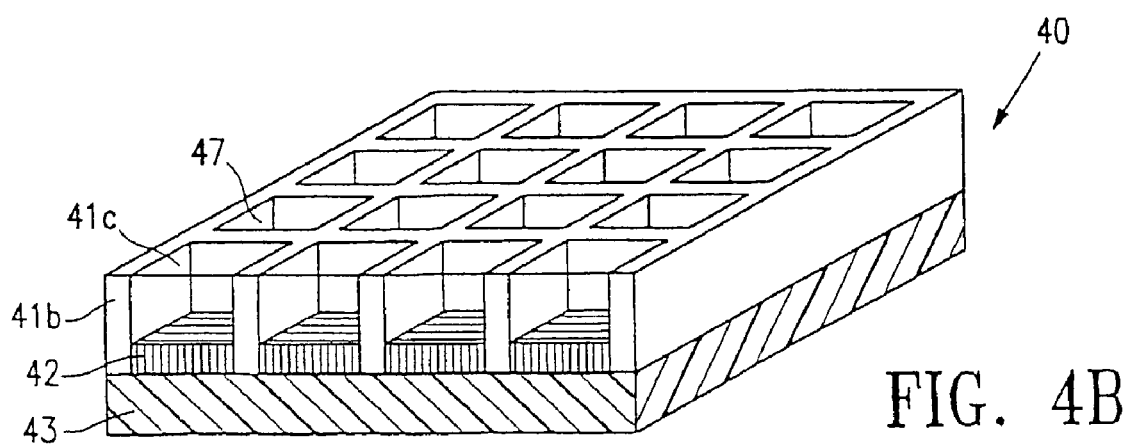

As shown in FIGS. 4A and 4B, the microcup array (40) may be prepared by exposure of a radiation curable material (41a) coated by known methods onto a conductor electrode film (42) to UV light (or alternatively other forms of radiation, electron beams and the like) through a mask (46) to form walls (41b) corresponding to the image projected through the mask (46). The base conductor film (42) is preferably mounted on a supportive substrate base web (43), which may comprise a plastic material.

In the photomask (46) in FIG. 4A, the dark squares (44) represent the opaque area and the space between the dark squares represents the transparent area (45) of the mask (46). The UV radiates through the transparent area (45) onto the radiation curable material (41a). The exposure is preferably directly onto the radiation curable material (41a), i.e., the UV does not pass through the substrate (43) or base conductor (42) (top exposure). For this reason, neither the substrate (43) nor the conductor (42) needs to be transparent to the UV or other radiation wavelengths employed.

As shown in FIG. 4B, the exposed areas (41b) become hardened and the unexposed areas (protected by the opaque area (44) of the mask (46)) are then removed by an appropriate solvent or developer to form the microcups (47). The solvent or developer is selected from those commonly used for dissolving or reducing the viscosity of radiation curable materials such as methylethylketone (MEK), toluene, acetone, isopropanol or the like. The preparation of the microcups may be similarly accomplished by placing a photomask underneath the conductor film/substrate support web and in this case the UV light radiates through the photomask from the bottom and the substrate needs to be transparent to radiation.

Exposure through Opaque Conductor Lines

Figure 5B:
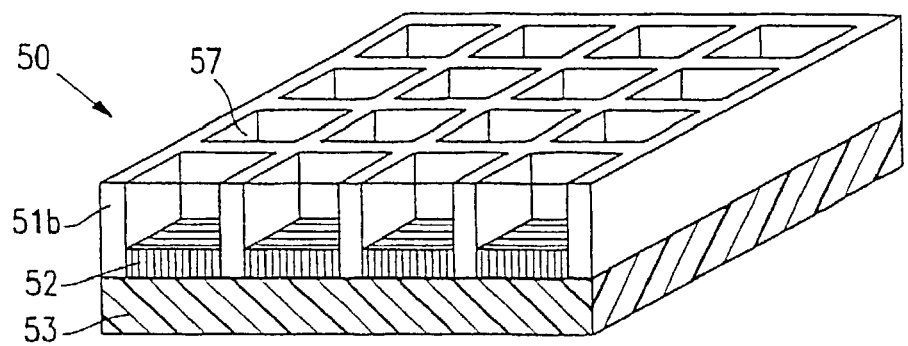
FIGS. 5A and 5B show alternative processing steps for preparing the microcups involving imagewise photolithography combining the top exposure and bottom exposure principles, whereby the walls are cured in one lateral direction by top photomask exposure and in the perpendicular lateral direction by bottom exposure through the opaque base conductor film ("combined exposure").
Figure 5A:
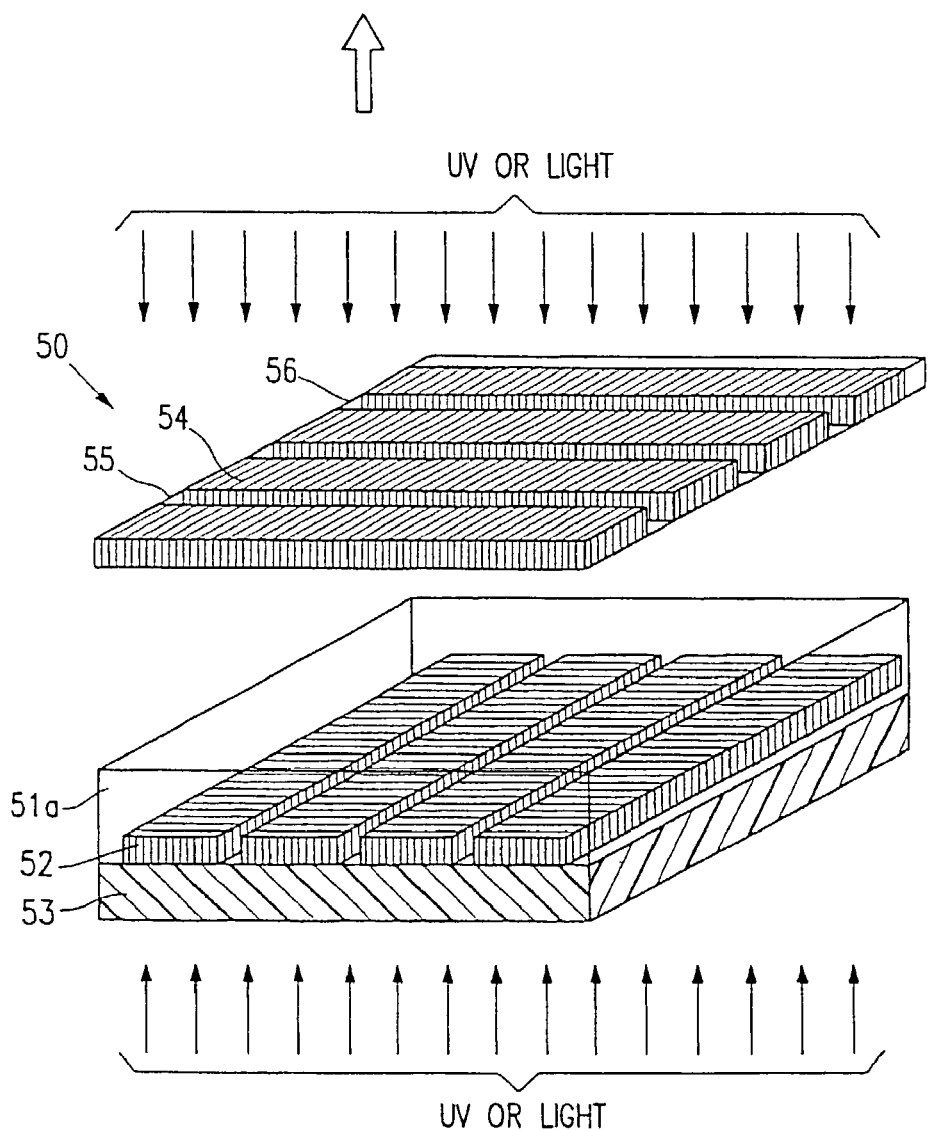

Still another alternative method for the preparation of the microcup array of the invention by imagewise exposure is illustrated in FIGS. 5A and 5B. When opaque conductor lines are used, the conductor lines can be used as the photomask for the exposure from the bottom. Durable microcup walls are formed by additional exposure from the top through a second photomask having opaque lines perpendicular to the conductor lines.

FIG. 5A illustrates the use of both the top and bottom exposure principles to produce the microcup array (50) of the invention. The base conductor film (52) is opaque and line-patterned. The radiation curable material (51a), which is coated on the base conductor (52) and substrate (53), is exposed from the bottom through the conductor line pattern (52) which serves as the first photomask. A second exposure is performed from the "top" side through the second photomask (56) having a line pattern perpendicular to the conductor lines (52). The spaces (55) between the lines (54) are substantially transparent to the UV light. In this process, the wall material (51b) is cured from the bottom up in one lateral orientation, and cured from the top down in the perpendicular direction, joining to form an integral microcup (57).

As shown in FIG. 5B, the unexposed area is then removed by a solvent or developer as described above to reveal the microcups (57).

IV. The Sealing Composition and Process of the Present Invention

The novel sealing overcoat composition comprises the following ingredients:

(1) a solvent or solvent mixture which is immiscible with the display fluid in the microcups and exhibits a specific gravity less than that of the display fluid; and (2) a thermoplastic elastomer.

Compositions containing a thermoplastic elastomer having good compatibility with the microcups and good barrier properties against the display fluid are particularly useful. Examples of useful thermoplastic elastomers include ABA, and (AB)n type of di-block, tri-block, and multi-block copolymers wherein A is styrene, α-methylstyrene, ethylene, propylene or norbornene; B is butadiene, isoprene, ethylene, propylene, butylene, dimethylsiloxane or propylene sulfide; and A and B cannot be the same in the formula.

Not to be bound by the theory, it is believed that the hard block of the thermoplastic elastomers phase separates during or after the drying of the sealing overcoat and serves as the physical crosslinker of the soft continuous phase. The sealing composition of the present invention significantly enhances the modulus and film integrity of the sealing layer throughout the coating and drying processes of the sealing layer. Thermoplastic elastomers having low critical surface tension (lower than 40 dyne/cm) and high modulus or Shore A hardness (higher than 60) have been found useful probably because of their favorable wetting property and film integrity over the display fluid.

The thermoplastic elastomer is dissolved in a solvent or solvent mixture which is immiscible with the display fluid in the microcups and exhibits a specific gravity less than that of the display fluid. Low surface tension solvents are preferred for the overcoating composition because of their better wetting properties over the microcup walls and electrophoretic fluid. Solvents or solvent mixtures having a surface tension lower than 35 dyne/cm are preferred. A surface tension of lower than 30 dyne/cm is more preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane and decalin and the like), alkylbezenes (preferably mono- or di-$C_{1-6}$alkyl benzenes such as toluene, xylene and the like), alkyl esters (preferably $C_{2-5}$alkyl esters such as ethyl acetate, isobutyl acetate and the like) and $C_{3-5}$ alkyl alcohols (such as isopropanol and the like and their isomers). Mixtures of alkylbenzene and alkane are particularly useful.

Wetting agents (such as the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn.) may also be included in the composition to improve the adhesion of the sealant to the microcups and provide a more flexible coating process. Other ingredients including crosslinking agents (e.g., bisazides such as 4,4'-diazidodiphenylmethane and 2,6-di-(4'-azidobenzal)-4-methylcyclohexanone), vulcanizers (e.g., 2-benzothiazolyl disulfide and tetramethyithiuram disulfide), multifunctional monomers or oligomers (e.g., hexanediol, diacrylates, trimethylolpropane, triacrylate, divinylbenzene, diallylnaphthalene), thermal initiators (e.g., dilauroyl peroxide, benzoyl peroxide) and photoinitiators (e.g., isopropyl thioxanthone (ITX), Irgacure 651 and Irgacure 369 from Ciba-Geigy) are also highly useful to enhance the physicomechanical properties of the sealing layer by crosslinking or polymerization reactions during or after the overcoating process.

The sealing composition is typically overcoated onto partially filled microcups and the overcoated microcups are dried at room temperature. The sealed microcups optionally may be post treated by UV radiation or thermal baking to further improve the barrier properties. The adhesion of the sealing layer to the microcups may also be improved by the post-curing reaction, likely due to the formation of an interpenetration network at the microcup-sealing layer interphase.

V. Preparation of Electrophoretic Displays from the Microcup Array

The preferred process of preparing the electrophoretic cells is illustrated schematically in FIGS. 6A–6D.

Figure 6A:
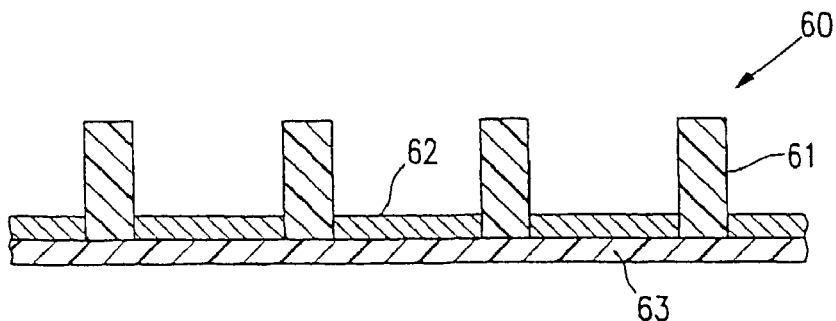
FIGS. 6A–6D are a sequence of cross sections of a microcup array, illustrating the steps of assembling a monochrome display.

As shown in FIG. 6A, the microcup array (60) may be prepared by any of the alternative methods described in Section III above. The unfilled microcup array made by the methods described herein typically comprises a substrate web (63) upon which a base electrode (62) is deposited. The microcup walls (61) extend upward from the substrate (63) to form the open cups.

Figure 6B:
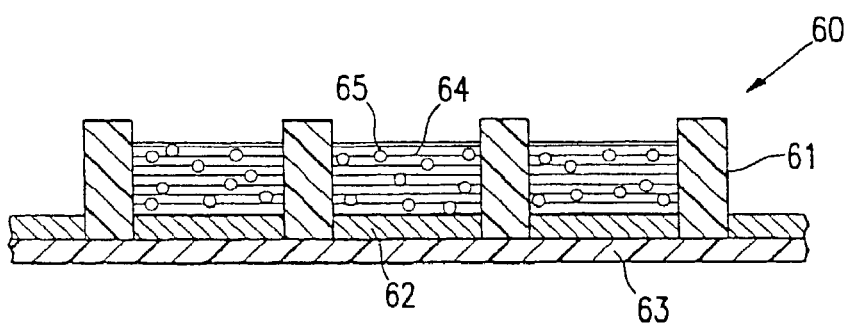

As shown in FIG. 6B, the microcups are filled with a suspension of the charged pigment particles (65) in a colored dielectric solvent composition (64). In the example shown, the composition is the same in each cup, i.e., in a monochrome display. In carrying out the sealing process of the present invention, the microcups are preferably partially filled (to prevent overflow), which can be achieved by diluting the electrophoretic fluid with a volatile solvent (such as acetone, methyl ethyl ketone, isopropanol, hexane, and perfluoro solvent FC-33 from 3M Co.,) and allowing the volatile solvent to evaporate. When a high boiling point perfluoro solvent such as HT-200 (from Ausimont Co., Thorofare, N.J.) is used as the continuous phase of the display fluid, a perfluoro volatile solvent such as FC-33 is particularly useful to control the level of partial filling.

Figure 6C:
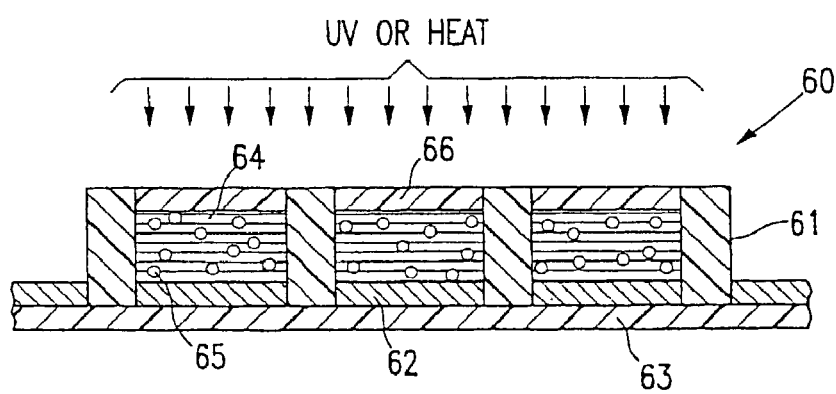

As shown in FIG. 6C, after filling, the microcups are sealed with the sealing composition of the present invention to form a sealing layer (66). The sealing composition is typically overcoated onto the partially filled microcups and dried on the display fluid. The sealed microcups optionally may be post treated by UV radiation or thermal baking to further improve the barrier properties.

Figure 6D:
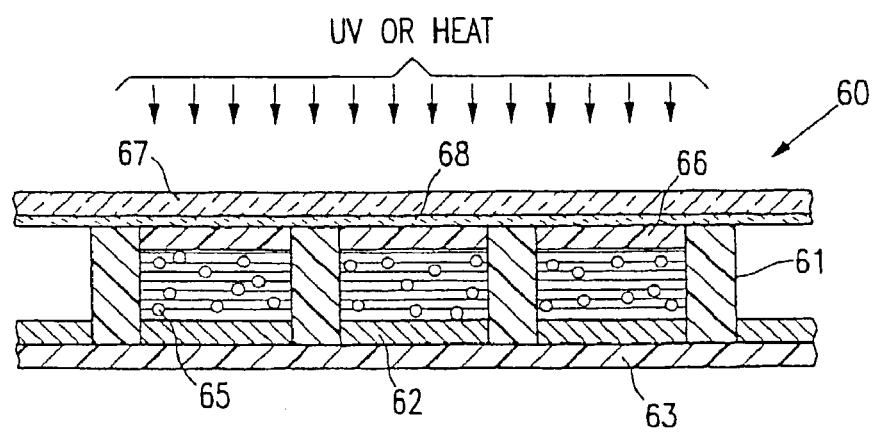

As shown in FIG. 6D, the sealed array of electrophoretic microcup cells (60) is laminated with a second conductor film (67), preferably by pre-coating the conductor (67) with an adhesive layer (68) which may be a pressure sensitive adhesive, a hot melt adhesive, or a heat, moisture, or radiation curable adhesive. The laminate adhesive may be post-cured by radiation such as UV through the top conductor film if the latter is transparent to the radiation.

VI. Preparation of the Pigment/Solvent Suspension or Dispersion Composition

As described herein with respect to the various embodiments of the EPD of the invention, the microcups are preferably filled with charged pigment particles dispersed in a dielectric solvent (e.g., solvent (64) and pigment particles (65) in FIG. 6B.). The dispersion may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106. See also *IEEE Trans. Electron Devices*, ED-24, 827 (1977), and *J. Appl. Phys.* 49(9), 4820 (1978).

The charged pigment particles visually contrast with the medium in which the particles are suspended. The medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalenes, halogenated solvents such as, dichlorobenzotrifluoride, 3,4,5-trichlorobenzotrifluoride, chloropentafluoro-benzene, dichlorononane, pentachlorobenzene, and perfluoro solvents such as perfluorodecalin, perfluorotoluene, perfluoroxylene, FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden, HT-200, and Fluorolink from Ausimont (Thorofare, N.J.) or Krytox Oils and Greases K-Fluid Series from DuPont, Del. In one preferred embodiment, poly(chlorotrifluoroethylene) is used as the dielectric solvent. In another preferred embodiment, poly (perfluoropropylene oxide) is used as the dielectric solvent.

A non-migrating fluid colorant may be formed from dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Ariz., Sudan Black B from Aldrich, Thermoplastic Black X-70 from BASF, and anthraquinone blue, anthraquinone yellow 114, anthraquinone red 111, 135, anthraquinone green 28 from Aldrich. Fluorinated dyes are particularly useful when perfluoro solvents are used. In the case of a pigment, the non-migrating pigment particles for generating the color of the medium may also be dispersed in the dielectric medium. These color particles are preferably uncharged. If the non-migrating pigment particles for generating color in the medium are charged, they preferably carry a charge which is opposite from that of the charged, migrating pigment particles. If both types of pigment particles carry the same charge, then they should have different charge density or different electrophoretic mobility. In any case, the dye or pigment for generating the non-migrating fluid colorant of the medium must be chemically stable and compatible with other components in the suspension.

The charged, migrating pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. These particles should have acceptable optical characteristics, should not be swollen or softened by the dielectric solvent, and should be chemically stable. The resulting suspension must also be stable against sedimentation, creaming or flocculation under normal operating conditions.

The migrating pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for producing the non-migrating fluid colorant may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed-coating and solvent evaporation.

For a black/white EPD, the suspension comprises charged white particles of titanium oxide ($TiO_2$) dispersed in a black dielectric solution containing a black dye or dispersed uncharged black particles. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged TiO$_2$ particles may be suspended in a dielectric fluid of cyan, yellow or magenta color. The cyan, yellow or magenta color may be generated via the use of a dye or a pigment. For an additive color system, the charged TiO$_2$ particles may be suspended in a dielectric fluid of red, green or blue color generated also via the use of a dye or a pigment. The red, green, blue color system is preferred for most applications.

EXAMPLES

Example 1

Microcup Formulation

35 Parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA, (UCB), 0.05 parts of Irgacure 369 (Ciba Specialty Chemicals) and 0.01 parts of isopropyl thioxanthone (ITX from Aldrich) were mixed homogeneously and used for micro-embossing.

Example 2

Preparation of Microcup Array

A primer solution comprising of 5 parts of Ebecryl 830, 2.6 parts of SR-399 (from Sartomer), 1.8 parts of Ebecry 1701, 1 part of PMMA (Mw=350,000 from Aldrich), 0.5 parts of Irgacure 500, and 40 parts of methyl ethyl ketone (MEK) was coated onto a 2 mu 60 ohm/sq. ITO/PET film (from Sheldahi Inc., MN.) using a #3 Myrad bar, dried, and UV cured by using the Zeta 7410 (5 w/cm$^2$, from Loctite) exposure unit for 15 minutes in air. The microcup formulation prepared in Example 1 was coated onto the treated ITO/PET film with a targeted thickness of about 50 µm, embossed with a Ni—Co male mold having a 60 (length)× 60 (width) µm repetitive protrusion square pattern with 25–50 µm protrusion height and 10 µm wide partition lines, UV cured from the PET side for 20 seconds, removed from the mold with a 2"peeling bar at a speed of about 4–5 ft/min. Well-defined micro-cups with depth ranging from 25 to 50 µm were prepared by using male molds having corresponding protrusion heights. Microcup arrays of various dimension such as 70 (length)×70 (width)×35 (depth)×10 (partition), 100 (L)×100 (W)×35 (D)×10 (P), and 100 (L)×100 (W)×30 (D)×10 (P)µm were also prepared by the same procedure.

Example 3

Pigment Dispersion 6.42 Grams of Ti Pure R706 were dispersed with a homogenizer into a solution containing 1.94 grams of Fluorolink D from Ausimont, 0.22 grams of Fluorolink 7004 also from Ausimont, 0.37 grams of a fluorinated copper phthalocyanine dye from 3M and 52.54 grams of perfluoro solvent HT-200 (Ausimont).

Example 4

Pigment Dispersion

The same as Example 3, except the Ti Pure R706 and Fluorolink were replaced by a polymer coated TiO$_2$ particles PC-9003 from Elimentis (Highstown, N.J.) and Krytox (Du Pont) respectively.

Example 5

Microcup Sealing

The electrophoretic fluid prepared in Example 3 was diluted with a volatile perfluoro co-solvent FC-33 from 3M and coated onto a 35 microns deep microcup array prepared in Example 2. The volatile cosolvent was allowed to evaporate to expose a partially filled microcup array. A 7.5% solution of polyisoprene (97% cis, from Aldrich) in heptane was then overcoated onto the partially filled cups by a Universal Blade Applicator with an opening of 3 mil. The overcoated microcups were then dried at room temperature. A seamless sealing layer of about 7–8 µm thickness (dry) with acceptable adhesion and uniformity was formed on the microcup array. No observable entrapped air bubble in the sealed microcups was found under microscope. A second ITO/PET conductor precoated with an adhesive layer was laminated onto the sealed microcups. The electrophoretic cell showed satisfactory switching performance with good flexure resistance. No observable weight loss was found after being aged in a 66° C. oven for 5 days.

Example 6

Microcup Sealing

The same as Example 5, except the thickness of the polyisoprene layer was reduced to 4 microns by using a blade applicator of 2 mil opening. Pinholes and broken sealing layer were clearly observed under optical microscope.

Example 7–14

Microcup Sealing

The same as Example 5, except the sealing layer was replaced by polystyrene, polyvinylbutyral (Butvar 72, from Solutia Inc., St. Louis, Mo.), thermoplastic elastomers such as SIS (Kraton D1107, 15% styrene), SBS (Kraton D1101, 31% styrene) SEBS (Kraton G1650 and FG1901, 30% styrene), or EPDM (Vistalon 6505, 57% ethylene). The results are summarized in Table 1. As it can be seen from Table 1, thermoplastic elastomers enabled thinner and higher quality sealing even on microcups of wide openings.

TABLE 1

Sealing of microcups

| Example No. | Sealing Polymer | Coating solution | Estimated dry thickness | Cup dimension (L × W × D × P), um | Coating quality (visual) | Coating quality (Microscopic) |
|---|---|---|---|---|---|---|
| comparative 6 | Polyisoprene (97% cis) | 7.5% in heptane | 4–5 um | 60 × 60 × 35 × 10 | fair | pinholes, broken layer |

TABLE 1-continued

Sealing of microcups

| Example No. | Sealing Polymer | Coating solution | Estimated dry thickness | Cup dimension (L × W × D × P), um | Coating quality (visual) | Coating quality (Microscopic) |
|---|---|---|---|---|---|---|
| comparative 5 | Polyisoprene (97% cis) | 7.5% in heptane | 7–8 um | 60 × 60 × 35 × 10 | good | good |
| comparative 7 | Polystyrene | 30% in toluene | 7–8 um | 60 × 60 × 35 × 10 | very poor, severe dewetting | incomplete sealing, defects |
| comparative 8 | Butvar 72 | 8.5% in isopropanol | 4–5 um | 60 × 60 × 35 × 10 | poor reproducibility | fair |
| 9 | SIS (Kratone D1107); 15% Styrene | 4% in Heptane | 4–5 um | 70 × 70 × 35 × 10 | good | good |
| 10 | SIS (Kratone D1107); 15% Styrene | 4% in Heptane | 3–4 um | 100 × 100 × 30 × 10 | good | good |
| 11 | SBS (Kraton D1101), 31% styrene | 10% in toluene/ heptane (20/80) | 4–5 um | 70 × 70 × 35 × 10 | good | good |
| 12 | SEBS(Kraton FG-1901, 30% styrene, 1.5% maleic anhrdride) | 10% in xylene/ Isopar E (5/95) | 4–5 um | 70 × 70 × 35 × 10 | good | good |
| 13 | SEBS(Kraton G1650, 30% styrene) | 5% in toluene/ heptane (5/95) | 4–5 um | 70 × 70 × 35 × 10 | good | good |
| 14 | EPDM (Vistalon 6505, 57% ethylene) | 10% in Isopar E | 4–5 um | 70 × 70 × 35 × 10 | good | good |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

For example, it should be noted that the method of the invention for making microcups may also be used for manufacturing microcup arrays for liquid crystal displays. Similarly, the microcup selective filling, sealing and ITO laminating methods of the invention may also be employed in the manufacture of liquid crystal displays.

It is therefore wished that this invention to be defined by the scope of the appended claims as broadly as the prior art will permit, and in view of the specification if need be.

What is claimed is:

1. An electrophoretic display which comprises display cells filled with an electrophoretic display fluid and sealed with a sealing layer formed from a sealing composition comprising a thermoplastic elastomer and a solvent or solvent mixture which is immiscible with the electrophoretic display fluid and exhibits a specific gravity lower than that of the electrophoretic display fluid.

2. The display of claim 1 wherein said thermoplastic elastomer is selected from the group consisting of ABA and (AB)n types of di-block, tri-block and multi-block copolymers, in which:
   A is styrene, a-methylstyrene, ethylene, propylene or norbornene,
   B is butadiene, isoprene, ethylene, propylene, butylene, dimethylsiloxane or propylene sulfide, and A and B are not the same, and n is ≧1.

3. The display of claim 2 wherein n is 1–10.

4. The display of claim 2 wherein said thermoplastic elastomer is selected from the group consisting of poly (styrene-b-butadiene), (poly(styrene-b-butadiene-b-styrene), poly(styrene-b-isoprene-b-styrene), poly(styrene-b-ethylene/butylenes-b-styrene), poly(styrene-b-dimethylsiloxane-b-styrene), poly($\alpha$-methylstyrene-b-isoprene), poly($\alpha$-methylstyrene-b-isoprene-b-$\alpha$-methylstyrene), poly($\alpha$-methylstyrene-b-propylene sulfide-b-$\alpha$-methylstyrene), poly(a-methylstyrene-b-dimethylsiloxane-b-$\alpha$-methylstyrene), and their grafted co-polymers or derivatives thereof.

5. The display of claim 1 wherein the thermoplastic elastomer is selected from the group consisting of poly (ethylene-co-propylene-co-5-methylene-2-norbornene), ethylene-propylene-diene terpolymer, their grafted co-polymers or derivatives thereof.

6. An electrophoretic display which comprises display cells filled with an electrophoretic display fluid and sealed with a sealing layer formed from a sealing composition comprising a thermoplastic elastomer selected from the group consisting of poly(styrene-b-butadiene), (poly(styrene-b-butadiene-b-styrene), poly(styrene-b-isoprene-b-styrene), poly(styrene-b-ethylene/butylenes-b-styrene), poly (styrene-b-dimethylsiloxane-b-styrene), poly($\alpha$-methylstyrene-b-isoprene), poly($\alpha$-methylstyrene-b-isoprene-b-$\alpha$-methylstyrene), poly($\alpha$-methylstvrene-b-propylene sulfide-b-$\alpha$-methylstyrene), poly($\alpha$-methylstyrene-b-dimethylsiloxane-b-$\alpha$-methylstyrene), and their gafted co-polymers or derivatives thereof, wherein said sealing composition further comprises a thermoplastic material that is compatible with the thermoplastic elastomer.

7. The display of claim 6 wherein the thermoplastic material is selected from the group consisting of polystyrene and poly($\alpha$-methylstyrene).

8. An electrophoretic display which comprises display cells filled with an electrophoretic display fluid and sealed with a sealing layer formed from a sealing composition comprising a thermoplastic elastomer wherein said sealing composition further comprises a wetting agent.

9. The display of claim 8 wherein said wetting agent is selected from the group consisting of surfactants, ZONYL fluorosurfactants, fluoroacrylates, fluoromethacrylates, fluoro-substituted long chain alcohols, perfluoro-substituted long chain carboxylic acids, SILWET silicone surfactants and their derivatives.

10. The display of claim 1 wherein said sealing composition further comprises one or more of the following agents: a crosslinking agent, a vulcanizer, a multifunctional monomer or oligomer, a thermal initiator or a photoinitiator.

11. An electrophoretic display which comprises display cells filled with an electrophoretic display fluid and sealed with a sealing layer formed from a sealing composition comprising a thermoplastic elastomer and a crosslinking agent, wherein said crosslinking agent is a bisazide.

12. The display of claim 11 wherein said bisazide is 4,4'-diazidodiphenylmethane or 2,6-di-(4'-azidobenzal)-4-methylcyclohexanone).

13. The display of claim 10 wherein said vulcanizer is a disulfide.

14. The display of claim 13 wherein said disulfide is 2-benzothiazolyl disulfide or tetramethylthiuram disulfide.

15. The display of claim 6 wherein said thermoplastic elastomer further comprises a comonomer.

* * * * *